Nov. 16, 1954  N. A. NELSON ET AL  2,694,279
TANDEM DISK HARROW
Filed April 4, 1950  6 Sheets-Sheet 1

Fig.1

INVENTORS
NORAL A. NELSON
ULRIC LANDENBERGER
BY
ATTORNEYS

United States Patent Office 2,694,279
Patented Nov. 16, 1954

2,694,279

TANDEM DISK HARROW

Noral A. Nelson and Ulric Landenberger, Detroit, Mich., assignors to Harry Ferguson, Inc., Detroit, Mich., a corporation of Delaware Application April 4, 1950, Serial No. 153,874

9 Claims. (Cl. 55—83)

The invention relates to tractor-drawn disc harrows and more particularly to disc harrows of the tandem type.

The general aim of the invention is to provide an improved tandem disc harrow especially well suited for operation with tractors equipped with power lift devices having automatic controls of the stress responsive type and adapted to make full use of the power lift and controls without modification or the addition of supplementary control devices. As an example of a tractor so equipped, reference may be had to the United States Ferguson Patent No. 2,118,180, issued May 24, 1938. In such tractors connection with the implement is effected by means of a three-point hitch linkage, including a pair of laterally spaced lower or draft links and a top or control link located above and substantially centrally of the draft links. The draft links are trailingly pivoted on the rear portion of the tractor housing and power-operated means, such as a hydraulic ram, is arranged to swing those links vertically.

With certain types of implements, as for example plows, the ground reaction on the implement when in operation tends to rock it forwardly and thus exert a compressive force on the top link of the hitch. In general this force is proportional to the working depth of the implement and is utilized through suitable control devices associated with the top link for controlling the operation of the ram. The arrangement is such that the links and attached implement are raised or lowered as required to maintain the implement at a substantially uniform depth determined by the setting of an associated manual controller. Through the medium of the manual controller the power lift may also be operated to raise the implement to an elevated or transport position clear of the ground and to lower it to working position.

The inherent operating characteristics of tandem disc harrows as heretofore constructed are such that it has not been practical to take advantage of the automatic depth control afforded by the tractor power systems or of the lifting of the implement for transport. In order to obtain the desired penetration of the discs, it has been customary to use a very heavy construction and to interconnect the disc gangs in a manner such that the ground reaction tends to rock the implement rearwardly rather than forwardly. As a result, a tensive stress is applied to the top link of the hitch rather than a compressive force, as is required for effecting the automatic depth control. Attempts have been made to devise auxiliary controls for adapting such harrows for automatic depth control, but these involve changes in and additions to the control mechanism of the tractor which interfere with the normal functioning of the power system with other implements. Moreover, the accuracy of the control thus obtained leaves much to be desired.

With the above in view, one object of the invention is to recognize the elements of a tandem disc harrow to produce a compact, balanced structure capable of actuating the power lift controls of the tractor in the normal manner so that the power lift may operate to maintain the implement at a substantially constant working depth.

Another object is to provide a novel arrangement for interconnecting the disc gangs of the harrow which affords sufficient flexibility to enable the gangs to follow the contour of the ground over which they are drawn and yet permits the implement to be lifted as a substantially rigid unit by the power lift mechanism of the tractor.

Another object is to provide an improved mounting arrangement for the disc gangs of the harrow and the angle adjusting means therefor which materially reduces the over-all length of the harrow and thus correspondingly reduces the overhanging weight imposed on the tractor when the implement is lifted to transport position.

It is also an object of the invention to simplify the construction of the harrow, to increase its strength and durability, and in general to provide an efficient and practical implement that can be manufactured at relatively low cost.

Other objects and advantages of the invention will become apparent from the following detailed description of the preferred embodiment illustrated in the accompanying drawings, in which.

While a preferred form of my improved disc harrow has been shown and will be described herein, it is to be understood that there is no intention to limit the invention to the particular construction illustrated, but on the contrary it is intended to cover all modifications and alternative constructions falling within the spirit and scope of the invention as expressed in the appended claims.

Figure 1:
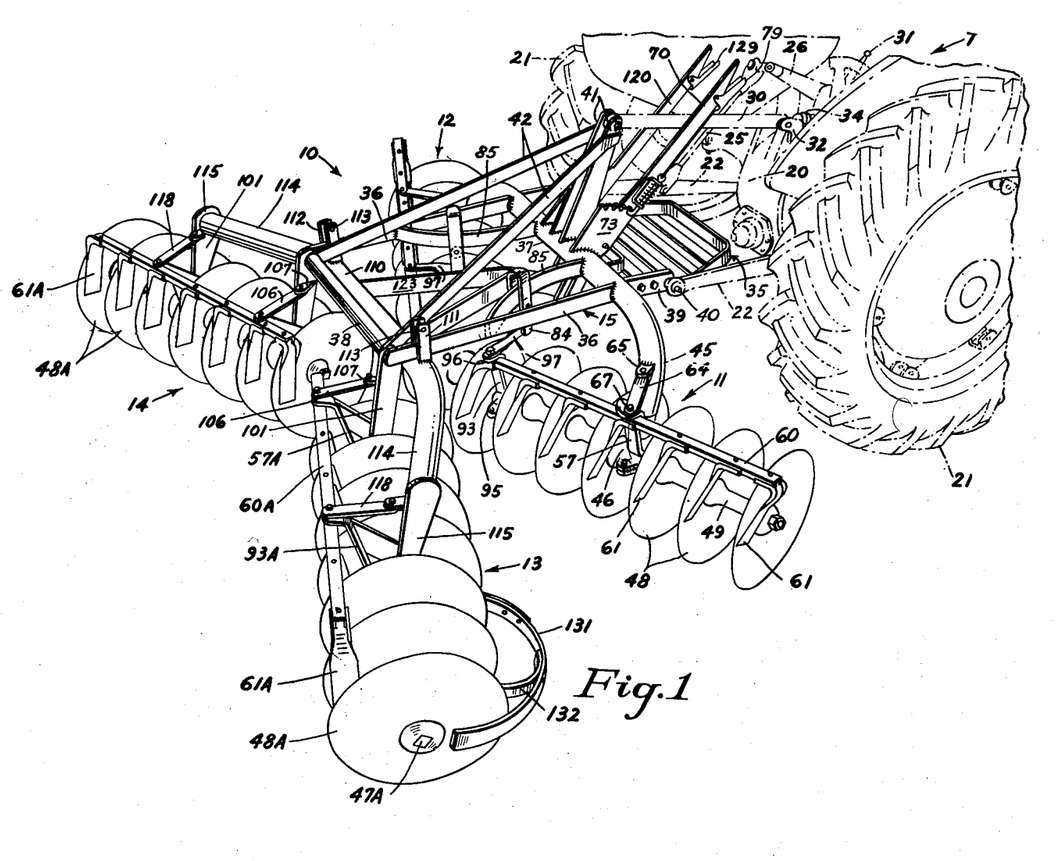
Figure 1 is a perspective view of a tandem disc harrow embodying the features of the invention, the harrow being shown with the disc gangs angled for working.
Figure 2:
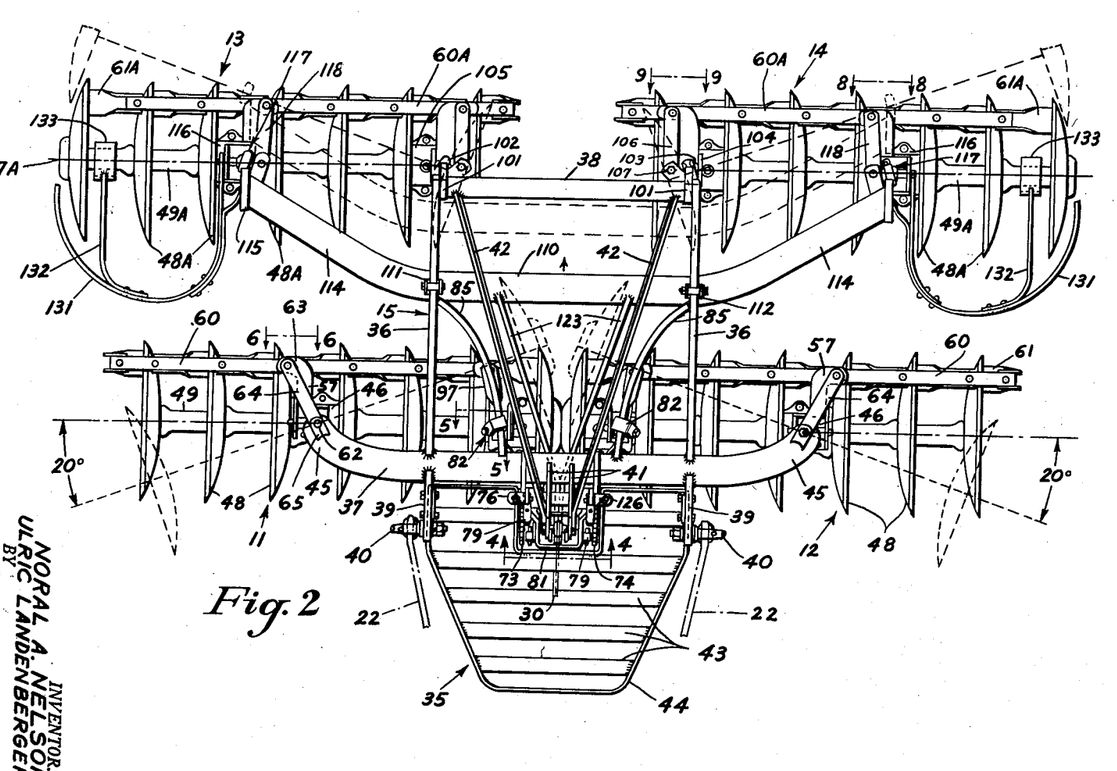
Fig. 2 is a top view of the disc harrow.
Figure 3:
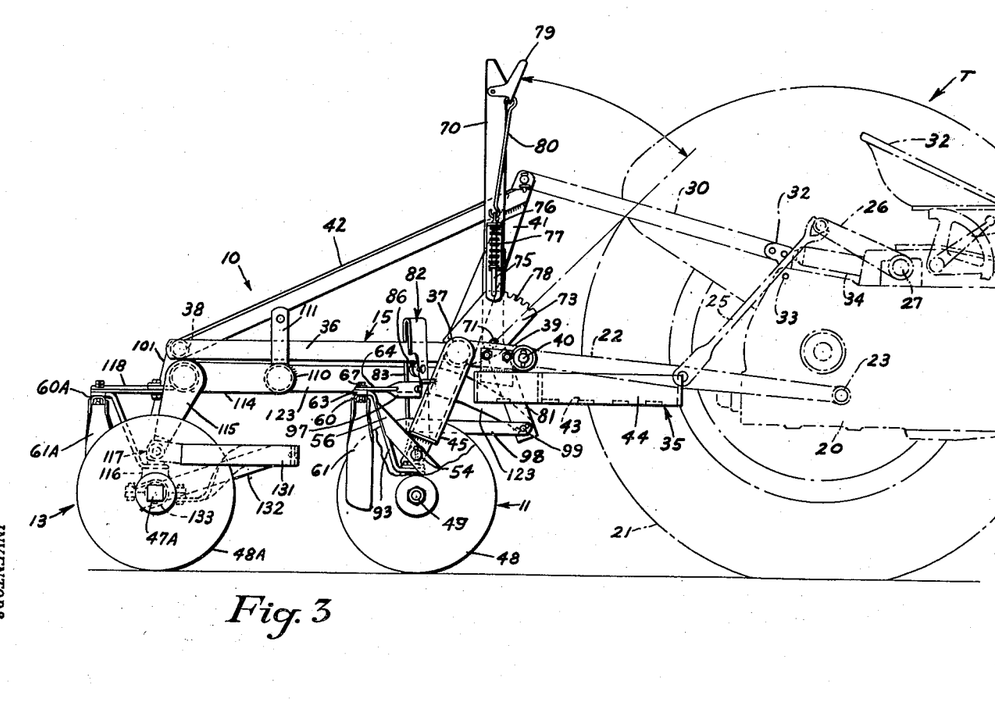
Fig. 3 is a side elevation of the disc harrow showing the gang discs straightened or in non-working position.

For purposes of illustration the invention has been shown as incorporated in a disc harrow 10 having a pair of front disc gangs 11 and 12 and a pair of rear disc gangs 13 and 14. The pairs of gangs are arranged in tandem relation and each gang is mounted for pivotal movement about a generally vertical axis so that the gangs may be angled for working as shown in Fig. 1 or straightened for transport as shown in Figs. 2 and 3. In Figs. 1 and 3 of the drawings the harrow is shown coupled in trailing relation to a lightweight tractor T equipped with the well-known "Ferguson" system of automatic draft control. Only the rear portion of the tractor has been shown including the center housing 20 on which the rubber tired traction wheels 21 are mounted.

For coupling an implement to the tractor a pair of laterally spaced forwardly converging draft links 22 are trailingly pivoted on the tractor housing as at points 23 located below and slightly forward of the tractor rear axle. To provide for swinging the draft links vertically to regulate the working depth of the implement, the draft links are connected by drop links 25 with crank arms 26 rigid with a cross shaft 27 journaled on the tractor housing. Through the medium of power actuated means of well-known construction located within the tractor housing, the shaft 27 may be rocked to raise or lower the draft links and the attached implement.

Control of the power actuated means in automatic draft control is effected by control mechanism actuated jointly by a top or control link 30 connected between the implement and the tractor and a manual controller such as a hand lever 31. This lever, which is commonly called the quadrant lever, is pivoted on the tractor housing at one side of the operator's seat 32 for convenient access by the operator.

In the ordinary power operated hitch linkage installation the top link 30 is connected to the implement in a manner such that a compressive force is applied thereto during normal working of the implement, such force being derived from the ground reaction on the implement. At its forward end the top link 30 is coupled with a shackle 32 pivotally mounted as at 33 on the tractor housing and operatively connected with a control plunger (not shown) associated in controlling relation with the control mechanism for the power actuated means. Forward movement of the shackle and control plunger is resisted by a compression spring 34. The arrangement is such that in the operation of an implement, the power actuated means is operated to raise or lower the draft links and the implement to establish a working depth at which the ground reaction on the implement maintains a predetermined stress on the control spring 34 as determined by the setting of the quadrant lever 31.

In accordance with the invention, the harrow 10 is constructed and arranged so that the ground reaction on the disc gangs results in the application of a compressive force on the top link 30 effective to actuate the control mechanism in the normal manner for obtaining automatic draft control. To this end the front disc gangs 11 and 12 are mounted on the frame 15 so that their pivotal axes are located substantially centrally of the respective gangs while the rear disc gangs 13 and 14 are mounted on the frame with their respective pivotal axes located adjacent the inner ends of the gangs. This mounting permits the disc gangs to be much more closely coupled than is customary in the conventional disc harrows thus producing a compact structure which is balanced with respect to the point of attachment of the draft links 22 so that ground reaction tends to rock the implement forwardly. This action is further enhanced by interconnecting the rear disc gangs in a manner which affords sufficient flexibility to allow the disc gangs to follow ground contours and yet provides a substantial degree of rigidity in the harrow structure. Thus the implement in operation generates the stresses required for controlling the power actuated means on the tractor without resort to changes in or additions to the controls normally provided on the tractor.

In working certain types of soils it is sometimes necessary to add extra weight to the harrow to secure the desired penetration of the discs. In the improved harrow, a suitable weight box 35 is provided for holding the extra weights, the box being associated with the frame structure of the harrow in a manner which effectively increases penetration without interfering with the actuation of the draft control instrumentalities.

The compact balanced construction of the harrow is further advantageous in reducing the overhanging weight imposed on the hitch linkage thus allowing the implement to be raised clear of the ground or to a transport position without overbalancing the tractor. Moreover, by reason of the rigid, unitary construction, the disc gangs are maintained in proper relation to each other and to the frame structure when the implement is lifted from the ground.

Referring now to Figs. 1–3 of the drawings, it will be observed that the implement frame 15 comprises a pair of laterally spaced side bars 36 welded or otherwise rigidly secured at opposite ends to a front cross member 37 and to a rear cross member 38. Forward extensions 39 of the side bars carry attaching pins 40 for connection with the trailing ends of the lower draft links 22. Connection with the top link 30 is effected through the medium of an upright strut comprising a pair of laterally spaced structural members 41 rigid with and projecting generally upwardly from the front frame member 37 approximately on the center line of the frame. Braces 42 extending from the upper ends of the members 41 to the rear portion of the frame impart strength and rigidity to the strut.

As will be seen by reference to Fig. 3 the axes of the attaching pins 40 are located so that the draft links 22 exert a downward as well as forwardly directed force on the implement thus tending to force the discs into the soil. Moreover, the top link 30 acting through the strut 41 normally holds the implement horizontal thereby insuring substantially equal penetrations of the front and rear discs. Of course, when the ground reaction on the discs exceeds the predetermined value for which the control mechanism is set, the implement tilts forwardly against the force exerted by the control spring 34, and the power actuated mechanism acts to raise the draft links and implement to reestablish the desired balanced condition. When ground reaction decreases below the predetermined value, the power actuated mechanism acts to lower the implement.

To preserve the balance when extra weights are added to increase penetration of the discs, the weight box 35 is secured to the frame 15 in advance of the points of connection of the draft links 22 with the frame. As shown in Figs. 1 and 2, the weight box comprises a plurality of parallel bottom slats 43 extending between and secured to the opposite legs of a generally V-shaped side member 44. In the exemplary harrow, the legs of the member 44 are extended rearwardly for connection with the extensions 39 of the frame 15. With this arrangement, the added weights tend to counterbalance the weight of the harrow structure with respect to the points of connection with the draft link and to assist in generating the stresses necessary for effecting automatic draft control. Moreover, the added weights are located in close proximity to the tractor thus minimizing the overhanging weight imposed thereon when the harrow is raised to transport position.

For supporting the front disc gangs 11 and 12, the front frame member 37, which is preferably tubular, is extended at opposite sides of the frame 15 and the end portions are bent to form downwardly and rearwardly directed legs 45. These legs carry split bearing blocks 46 for journaling the front disc gangs. As both of these gangs are alike, a description of one will suffice. Each gang comprises a shaft 47 (Figs. 5 and 6) upon which are mounted a plurality of conventional discs 48, there being six such discs in the exemplary implement. Spacing sleeves 49 interposed between the discs hold them in fixed spaced relation axially of the shaft. One of these spacing sleeves 49, in this instance the sleeve located centrally of the disc gang, is shaped for reception in the bearing 46.

Figures 5, 6:
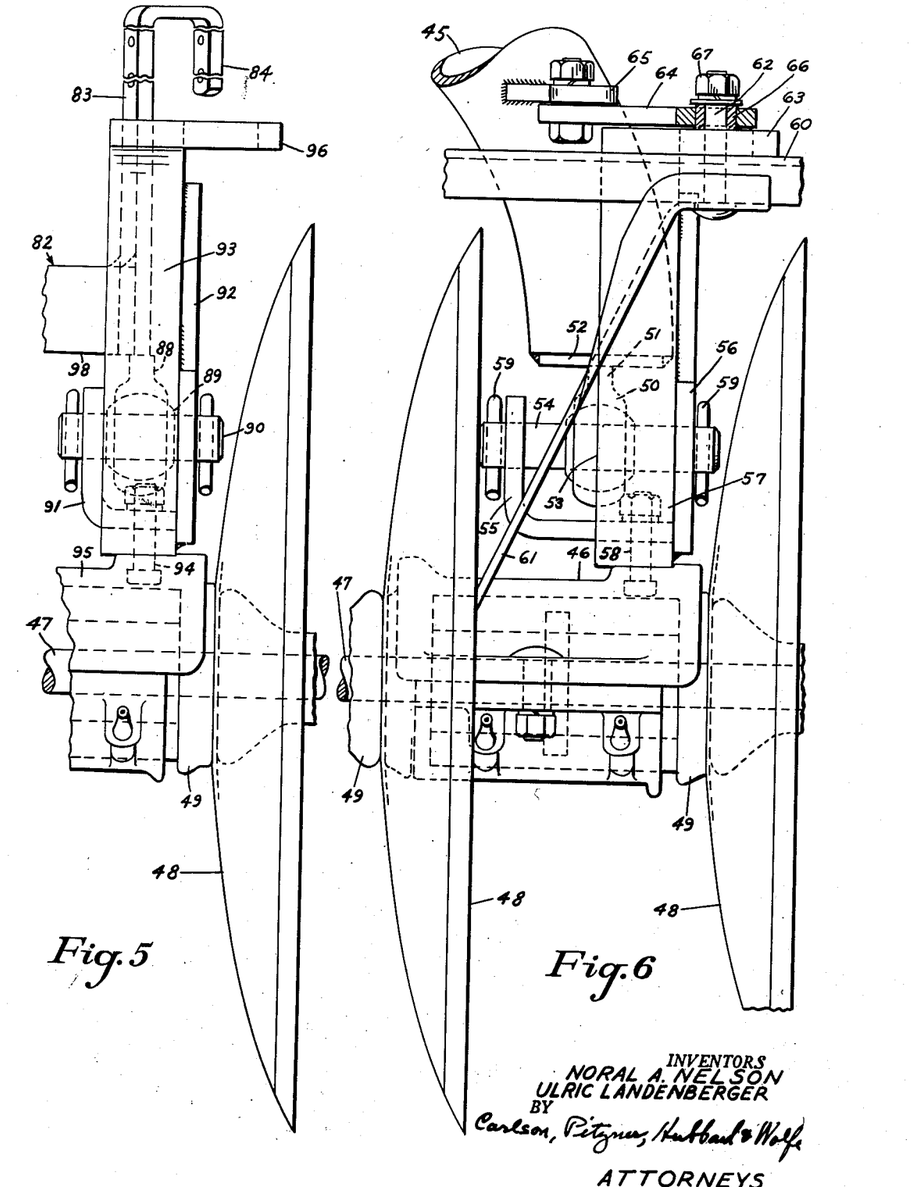
Fig. 5 is a fragmentary elevational view taken in a plane substantially on the line 5—5 of Fig. 2 showing the connection of the adjusting mechanism to one of the front disc gangs.
Fig. 6 is a fragmentary elevational view taken in a plane substantially on the line 6—6 of Fig. 2 showing the bearing support for one of the front disc gangs.

To afford the flexibility for enabling the gangs to conform to ground contour, the supporting bearings 46 are connected to the associated legs 45 of the frame member in a manner which permits them to rock about substantially horizontal axes as well as to pivot about vertical axes. The means for effecting this connection, as shown in Fig. 6 includes for each gang a swivel member having a body portion 50 and a shank portion 51. The latter is rotatably received in a vertically disposed socket formed in a block 52 welded or otherwise rigidly secured in the end of the leg 45.

Fitted into a generally spherical socket in the body 50 of the swivel member is a complementally shaped bearing element 53 apertured to receive an attaching pin 54. In the exemplary structure the pin 54 is inserted through alined holes in the upright leg of an L-shaped bracket 55 and in a reinforcing bar 56 extending diagonally between the legs of a second generally L-shaped bracket 57. These two brackets are mounted upon the upper section of the bearing 46 and are rigidly secured thereto as by bolts 58. Securing elements such as cotter pins 59 in the ends of the pin 54 hold the parts in assembled relation. As will be seen by reference to Fig. 6 of the drawings, the bracket 55 is spaced from the bar 56 so as to allow substantial axial movement of the pin 54 through the ball element 53 and concurrent movement of the disc gang attached by the pin. The range of movement permitted by this construction is preferably such that the inner ends of the front gangs 11 and 12 may abut, as shown in Fig. 2, and thus counterbalance the opposing forces of the earth reaction on the respective gangs.

As herein shown, the bracket 57 serves as a support for a scraper carrying bar 60 extending longitudinally of the gang above the discs adjacent their trailing edges. Depending scrapers 61 removably secured to the bar 60 as by bolts 62 coact with the respective discs 48 to remove any soil which tends to stick to the discs. As will be seen by reference to Figs. 3 and 6, the upright leg of the bracket 57 is inclined rearwardly and terminates in a rearwardly and laterally turned portion 63 adapted to be secured to the bar 60 by one of the attaching bolts 62. A rigid link 64 connected between a lug 65 on the leg 45 and the bolt 62 connecting the bar 60 with the bracket 57 restrains the disc gang from rotation about the axis of the pin 54. In the particular embodiment illustrated, a spacing sleeve 66 serving as a bearing for the link 64 is interposed between the bracket portion 63 and the nut 67 threaded on the bolt 62 thus enabling the bolt to perform its securing function while leaving the link free to accommodate rocking movements of the disc gang.

Means is provided for adjusting the angular position of the front gangs 11 and 12 with respect to the line of draft of the implement and for retaining them in adjusted positions. The adjusting means as herein shown comprises an elongated lever 70 pivotally supported on a cross pin 71 carried between a pair of upright sector plates 73 and 74 rigid with the front frame member 37. An L-shaped latch pin 75 slidably supported in a guide 76 fixed to one side of the lever 70 is yieldably urged by a spring 77 into a selected one of a series of notches 78 in the sector plate 73 to retain the lever in a selected position of adjustment. The latch pin may be withdrawn to release the lever for resetting by means of a conventional trigger element 79 pivoted on the free end of the lever 70 and connected with the latch pin by a link 80.

Figures 4, 7:
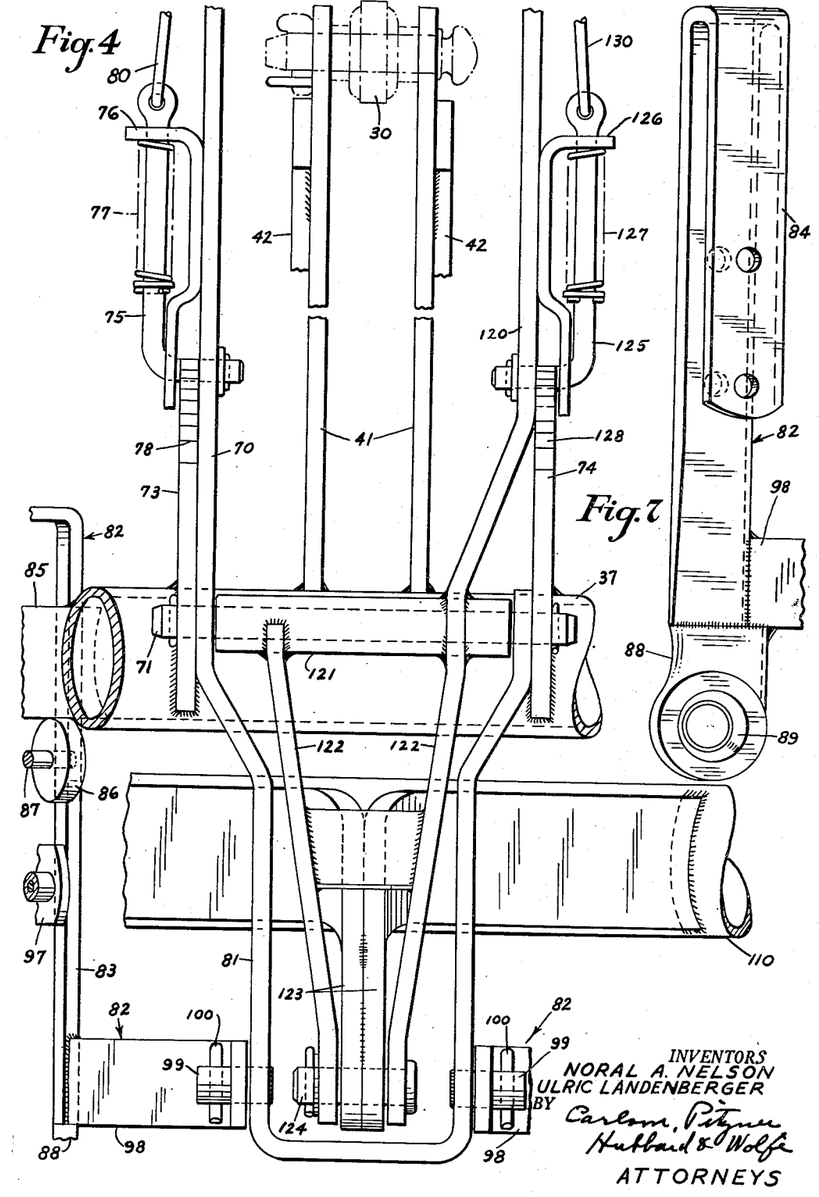
Fig. 4 is a fragmentary sectional view taken in a plane substantially on the line 4—4 of Fig. 2, showing details of the gang adjusting mechanism.
Fig. 7 is a fragmentary perspective view of the front disc gang guide.

As shown in Fig. 4, the lower end portion of the lever 70 is reversely bent to form a U-shaped extension 81 depending below the pivot pin 71 and the outside leg of this extension is apertured to fit on the pin and thus provide additional bearing support for the lever. At its lower end the extension 81 is connected with a pair of gang supporting and guiding hangers 82 one of which is provided for each of the front disc gangs.

The hangers 82 are alike. As shown in Figs. 4, 5 and 7, each hanger comprises an upright portion herein shown as an elongated flat bar adapted to be pivotally connected at its lower end with one of the front disc gangs adjacent the inner end of the gang as will appear presently. The opposite end portion 84 of the bar 83 is reversely bent and spaced from the body of the bar to define a downwardly opening slot adapted to slidably receive an arcuate guide bar 85 (Figs. 1 and 2) extending between the front frame member 37 and one of the side members 36. A roller 86 (Figs. 3 and 4) carried by a shaft 87 supported between the bar 83 and its end portion 84 closes the slot and limits the relative vertical movements of the front gang and frame structure. Preferably, a plurality of vertically spaced holes are provided in the bar and its end portion for the shaft 87 so that the roller may be adjusted to afford different degrees of movement of the gang as required for varied conditions of operation. The roller 86 also constitutes a bearing on which the guide bar 85 may ride when the disc gang is rocked to one limit position.

For connection with the disc gang, the bar 83 is provided at its lower end with a fitting 88 (Figs. 5 and 7) formed with a generally spherical socket seating a ball element 89. The ball element is apertured for the reception of a connecting pin 90 inserted through apertures in the upright leg of an L-shaped bracket 91 and in a fixed brace bar 92 spaced therefrom. The bar 92 extends diagonally between the legs of a second L-shaped bracket 93 which, with the bracket 91, is rigidly secured to the upper section of a split bearing 95. This bearing journals the inner end of the disc gang shaft 47.

The bracket 93 cooperates with the bracket 57 in supporting the scraper bar 60. To this end the upright leg of the bracket is inclined rearwardly and terminates in a laterally directed tip 96 adapted to be bolted to the scraper bar. A rigid link 97 pivotally connected to the bar 83 and to the scraper bar 60 adjacent its connection with the bracket 93 restrains the gang against bodily rotation about the axis of the pin 90.

Extending forwardly from the upright bar 83 of the guide bracket is a rigid arm 98 (Figs. 3, 5 and 7) pivotally connected with the lower end of the angle adjusting lever 70. As shown in Fig. 4, the pivotal connection is provided by a stud 99 anchored in the depending extension 81 of the lever, the arm 98 being apertured to receive the stud. A cotter pin 100 retains the parts in assembled relation. Accordingly, forward movement of the lever 70 is effective to swing the inner ends of both front gangs rearwardly and the gangs may be securely locked in any selected position of adjustment by the latch bar 75. Conversely, rearward movement of the lever 70 swings the gangs toward the straight or non-working position in which they are shown in Fig. 3.

It will be understood, of course, that the structure for supporting and guiding the inner end of the disc gang 11 is duplicated for the front disc gang 12. Corresponding parts have therefore been designated by the same reference characters.

The rear disc gangs 13 and 14 are substantially identical in construction with the front disc gangs 11 and 12. Each includes a plurality of discs 48a held in axially spaced relation on a shaft 47a by spacing sleeves 49a. In the exemplary implement, there are seven discs in each rear gang and in accordance with the usual practice these discs are faced oppositely with respect to the front discs to counterbalance the lateral forces. Each rear gang also has its individual scraper bar 60a carrying scrapers 61a for the respective discs 48a. Brackets 57a and 93a similar in construction to the brackets 57 and 93 support the scraper bar.

To permit the extremely close coupling of the front and rear disc gangs which is an important characteristic of applicant's improved disc harrow, the rear disc gangs are mounted to pivot about generally vertical axes located closely adjacent their inner ends. With this arrangement the front and rear gangs may be swung in opposite directions without interfering between the straight or non-working position in which they are shown in full lines in Fig. 2 and the angled or working position indicated in broken lines in that figure, the latter representing an angular movement in the neighborhood of 20°.

Figure 9:
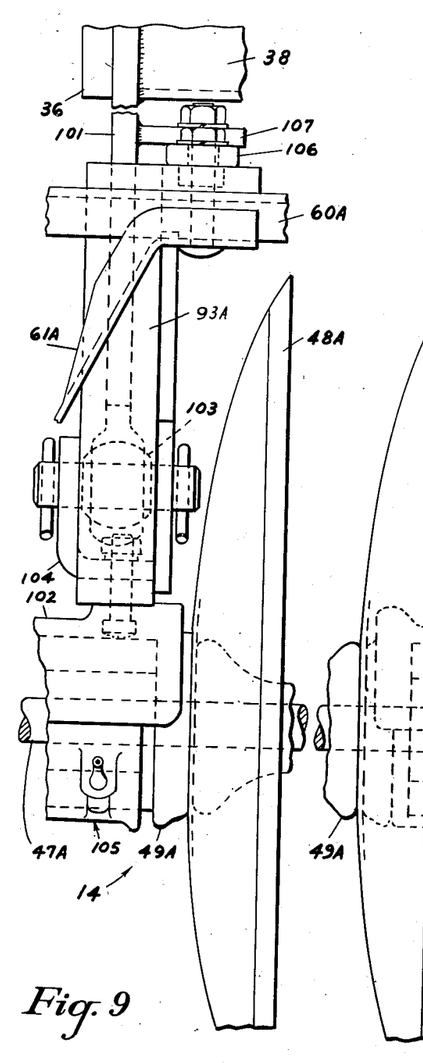
Fig. 9 is a fragmentary elevational view taken in a plane substantially on the line 9—9 of Fig. 2, showing the bearing support for one of the rear disc gangs.

Pivotal support for the rear disc gangs 13 and 14 is provided by a pair of rigid legs 101 depending from opposite sides of the frame 15 adjacent its rear edge as shown in Figs. 1, 2 and 9. Each of the legs carries at its lower end a fitting 102 having a ball joint connection 103 with a bracket 104 rigidly secured to a bearing 105 for journaling the gang shaft 47a. This connection permits transverse rocking of the gang to follow ground contour in addition to the pivotal movement about a substantially vertical axis for angling the gang. A rigid link 106 connected between the scraper bar 60a and a lug 107 on the leg 101 prevents bodily rotation of the gang about the axis of the fitting.

The rear disc gangs 13 and 14 are interconnected for simultaneous adjustment of their angular positions in a novel manner such that they form what may be called a semi-rigid unit which materially enhances the ability of the implement to control the draft responsive mechanism of the tractor. This connection includes an elongated tubular member 110 extending below and transversely of the frame 15 and guided for fore and aft movement thereon by spaced hangers 111 and 112 cooperating with the side members 36 and frame. As herein shown, each of the hangers comprises a pair of rigid arms welded or otherwise secured to the member 110 and spaced apart for the reception of the frame member. A cross pin 113 closes the open end of the hanger and restricts downward movement of the member 110 relative to the frame.

Figure 8:
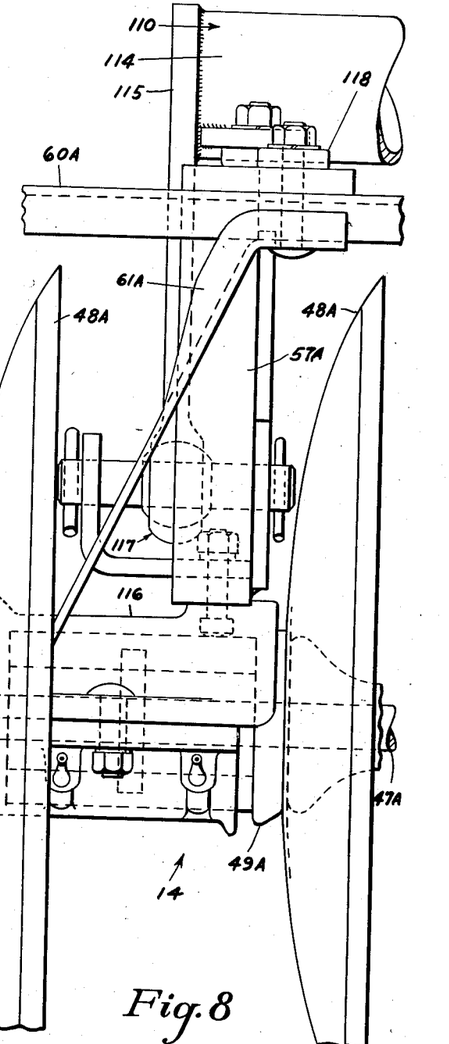
Fig. 8 is a fragmentary elevational view taken in a plane substantially on the line 8—8 of Fig. 2, showing the connection of the gang adjusting mechanism with one of the rear disc gangs.

In the exemplary implement the end portions 114 of the tubular connecting member 110 are turned rearwardly and each has attached at its extreme end a depending leg 115. This leg is connected at its lower end with a bearing 116 (Figs. 2 and 8) by a ball and socket connection 117 which permits universal pivotal movement of the bearing with respect to the supporting leg. The bearing 116 journals the gang shaft 47a and is preferably located substantially centrally of the gang. Movements of the gang relative to the supporting leg are restricted to intersecting horizontal and vertical axes by a brace bar 118 extending between the leg 115 and the scraper bar 60a.

Provision is made for shifting the gang connecting member 110 forwardly or rearwardly to adjust the angular positions of the rear gangs 13 and 14. This adjusting means as shown in Figs. 1, 2, and 4 comprises a hand lever 120 pivotally supported adjacent the sector plate 74 at one side of the front gang adjusting lever 70. Support for the lever 120 is provided in this instance by an elongated hub 121 journaled on the pivot pin 71 which supports the companion lever, the hub being disposed between the lever 70 and its reversely bent end portion as shown in Fig. 4.

Depending from the hub 121 are a pair of rigid arms 122 having their free ends spaced apart to receive a pair of rigid bars 123. These bars are pivotally connected to the arms by a through pin 124 and extend rearwardly and outwardly to the member 110 to which they are secured as by welding. Accordingly, the rear disc gangs may be shifted to their angled or working position by rocking the lever 120 forwardly, thereby imparting a rearward movement to the connecting member 110 from the non-working position shown in Fig. 2. The gangs may be returned to their straight or non-working position by rocking the lever in the reverse direction. It will be observed that by reason of the novel mounting of the rear gangs, the over-all front to rear dimensions of the implement are reduced to a minimum when the gangs are set in their straight or non-working position. The overhanging weight imposed on the tractor is thus minimized.

Any suitable means may be utilized for latching the angle adjusting lever 120 in selected positions of adjustment. As shown in Fig. 4, the latching means comprises an L-shaped latch pin 125 slidably supported in a guide 126 on one side of the lever and urged by a spring 127 toward the notched edge 128 of the plate 74. A trigger element 129 (Fig. 1) pivoted on the upper end of the lever and connected to the latch pin by a link 130 is operable to withdraw the latch and release the lever by resetting.

Guard means is provided on each of the rear disc gangs 13 and 14 to prevent the gangs from hooking onto posts, trees or other obstructions and to protect the outer discs of the gangs from damage. As shown in Figs. 1–3, the guard means in its preferred form comprises a bumper comprising generally V-shaped metal strap 131 rigidly anchored at one end to the bearing 116 and extending forwardly and outwardly over the three outer discs 48a. Intermediate its ends, the strap is supported by a bar 132 connected between the strap and a sleeve 133 rotatably supported on the spacer 49a adjacent the outer dics 48a.

It will be apparent from the foregoing that the invention provides a gang type disc harrow of novel and advantageous construction. The novel mounting of the gangs results in a much more compact structure than is attainable with the conventional construction and yet allows angling of the disc gangs to the full extent required for efficient working. Moreover, a relatively rigid unitary structure is obtained which is capable of converting the ground reaction on the discs into the stresses required for actuating the depth control mechanism of the tractor. Thus, for the first time a disc harrow has been provided which is capable of taking full advantage of the power lift and controls of tractors equipped with a power operated hitch linkage. Provision is made for placement of added weights required for increased penetration in a manner such that the depth control action of the implement is enabled to function normally and at the same time the overhanging weight imposed on the tractor is reduced substantially so that the implement may be raised to transport position without overbalancing the tractor. This characteristic is further enhanced by the compact balanced construction of the harrow and particularly the close coupling of the front and rear gangs and their close association with the tractor.

We claim:

1. In a disc harrow, in combination, a generally rectangular frame including side members and a front member having its opposite ends projecting substantially beyond said side members, a disc gang connected substantially centrally at each end of said front member to rock about a substantially horizontal axis and to pivot about a generally vertical axis, supporting and guiding means for the inner ends of said gangs including a pair of arcuate guide bars extending between the front member and the respective side members of the frame, and a pair of hangers slidably engaging the respective guide bars and each having a pivotal connection with one of said disc gangs.

2. In a tandem type disc harrow, in combination, a generally rectangular frame including side members, a front member and a rear member, said front frame member projecting substantially beyond the sides of the frame and having its projecting ends shaped to define downwardly directed legs, a pair of disc gangs each having a central bearing operatively connected with one of said legs, a pair of rigid legs depending from opposite sides of said frame adjacent its rear edge, a second pair of disc gangs each having a bearing adjacent its inner end operatively connected with one of said depending legs, said connections permitting said gangs to swing on generally vertical axes between working and non-working positions and to pivot about generally horizontal axes for following ground contour, an elongated member extending transversely across said frame and supported for movement fore and aft thereon, and depending legs at opposite ends of said elongated member pivotally connected to the respective gangs of said second pair substantially centrally of the gangs, said elongated member being operative in its movements relative to the frame to swing the associated gangs about their vertical axes between working and non-working positions and being further operative to confine the pivoting of those gangs about horizontal axes within predetermined limits.

3. In a disc harrow, in combination, a rigid frame including a tubular cross member projecting at opposite sides of the frame, the projecting ends of said member being bent to form downwardly and rearwardly directed legs, means connecting each of said legs with a bearing for rotatably supporting a disc gang, each of said connecting means comprising a fitting mounted on one of the legs for pivotal movement about a generally vertical axis, a ball element rotatably seated in said fittings, a bracket rigidly secured to the bearing, a pin carried by said bracket and extending through said ball element, and brace means for restraining the bearing from rotation about the axis of the pin while permitting rocking movement transaxially of the pin.

4. In a disc harrow, in combination, a rigid frame including a tubular cross member projecting at opposite sides of the frame, the projecting ends of said member being bent to form downwardly and rearwardly directed legs, means connecting each of said legs with a bearing for rotatably supporting a disc gang, each of said connecting means comprising a fitting mounted on one end of the legs for pivotal movement about a generally vertical axis, and a ball joint connection between said fitting and said bearing, permitting pivotal movement of the disc gang about a plurality of axes all disposed in a common plane perpendicular to the pivot provided by said fitting.

5. In a disc harrow, in combination, a generally rectangular frame including side members and a front member extending substantially beyond said side members, a disc gang connected substantially centrally to each end of said front member for pivotal movement about a generally vertical axis, supporting and guiding means for the inner ends of said gangs including a pair of arcuate guide bars extending between the front member and the respective side members of the frame, a hanger for each disc gang including an upright member pivotally connected at its lower end to the disc gang, the upper end of said hanger being shaped to define a slot for slidably receiving one of said guide bars, and a roller element mounted on the hanger operative to retain the guide bar in said slot and to provide a bearing on which said guide bar may ride.

6. In a tandem disc harrow, in combination, a frame, a pair of front disc gangs and a pair of rear disc gangs connected to said frame to swing about generally vertical axes, adjusting means mounted on said frame and operatively connected with the gangs, the connection with each rear gang including a bearing member located substantially centrally of the gang, guard means for each rear gang comprising a V-shaped metal strap rigidly supported at one end on said bearing member and having its other end extending in overlying relation to the outside disc of the gang, and a support for the intermediate portion of said strap including a rigid bar connected between the strap and a member rotatably mounted on the disc gang adjacent the outside disc.

7. In a disc harrow, in combination, a generally rectangular frame including side members, a front member and a rear member, said front member having its opposite ends projecting substantially beyond said side members, disc gangs connected to the projecting ends of said front member for universal pivotal movement, guide means for limiting the range of movement of each gang in horizontal and vertical planes comprising an arcuate guide bar extending between the front frame member and the side member adjacent the gang, an elongated member secured at one end to the gang and having a slot adjacent its other end for slidably receiving said guide bar, the ends of said slot defining the upper and lower limit positions of the gang, and said front and side frame members defining the forward and rearward limit positions of the gang.

8. In a disc harrow, in combination, a generally rectangular frame including side members, a front member and a rear member, a pair of disc gangs connected to the front frame member, a pair of legs depending from said frame at opposite ends of the rear frame member, a disc gang connected adjacent its inner end to each of said legs for universal pivotal movement, an elongated rigid member extending transversely of said frame below the side members of the frame, said rigid member having depending legs at opposite ends connected with the respective disc gangs, and hangers on said rigid member cooperating with the side members of the frame for guiding the rigid member in a fore and aft adjusting movement, said hangers additionally cooperating with the side members of the frame for limiting the up and down movements of the rigid member.

9. In a disc harrow, in combination, a frame, a pair of disc gangs each including a bearing, means supporting the bearings of the respective gangs at opposite sides of said frame, each of said supporting means comprising a fitting mounted on the frame for pivotal movement about a vertical axis, said fitting having a generally spherical socket open at opposite sides, an apertured ball rotatably seated in said socket, a pin inserted through the aperture in said ball and projecting at opposite sides through the openings for the socket, brackets secured to the bearing of the associated disc gang engaging opposite ends of said pin, the brackets on each bearing being spaced apart to permit axial movement of the pin through the ball and concurrent axial movement of the gang so as to bring the inner ends of the two gangs into abutting relation.

References Cited in the file of this patent

UNITED STATES PATENTS

| Number | Name | Date |
|---|---|---|
| 1,113,241 | Niesz | Oct. 13, 1914 |
| 1,156,843 | Imus | Oct. 12, 1915 |
| 1,260,497 | Willis | Mar. 26, 1918 |
| 1,421,047 | Ward | June 27, 1922 |
| 1,670,407 | Hand | May 22, 1928 |
| 1,710,124 | Traphagen | Apr. 23, 1929 |
| 1,832,049 | Peterson | Nov. 17, 1931 |
| 2,171,768 | Sjogren et al. | Sept. 5, 1939 |
| 2,320,624 | Love | June 1, 1943 |
| 2,552,307 | Bowman | May 8, 1951 |
| 2,644,388 | Oehler | July 7, 1953 |

OTHER REFERENCES

"Tandem Disc Harrow," Dearborn Motors Advertisement, published 1948.